(12) United States Patent
Schaffert (10) Patent No.: US 9,374,942 B2
(45) Date of Patent: Jun. 28, 2016

(54) SEEDING FOLLOWER ISOLATION DEVICE

(75) Inventor: Paul E. Schaffert, Indianola, NE (US)

(73) Assignee: SCHAFFERT MANUFACTURING COMPANY, INC., Indianola, NE (US)

( * ) Notice: Subject to any disclaimer, the term of this patent is extended or adjusted under 35 U.S.C. 154(b) by 616 days.

(21) Appl. No.: 13/428,610

(22) Filed: Mar. 23, 2012

(65) Prior Publication Data

US 2012/0266794 A1 Oct. 25, 2012

Related U.S. Application Data (60) Provisional application No. 61/466,683, filed on Mar. 23, 2011.

(51) Int. Cl.
*A01C 5/06* (2006.01)
*A01C 7/20* (2006.01)

(52) U.S. Cl.
CPC ............... *A01C 5/062* (2013.01); *A01C 7/201* (2013.01); *A01C 7/206* (2013.01)

(58) Field of Classification Search
USPC ................ 111/52, 150, 189, 197, 118, 119
See application file for complete search history.

(56) References Cited

U.S. PATENT DOCUMENTS

| | | | | |
|---|---|---|---|---|
| 435,249 A * | 8/1890 | Rush | | 111/63 |
| 1,031,167 A * | 7/1912 | Bushnell | | 111/197 |
| 1,104,602 A * | 7/1914 | Akers | | 111/190 |
| 2,849,969 A * | 9/1958 | Taylor | | 111/190 |
| 3,308,075 A * | 3/1967 | Cohen et al. | | 524/24 |
| 5,640,915 A | 6/1997 | Schaffert et al. | | |
| 5,664,507 A | 9/1997 | Bergland et al. | | |
| 6,666,156 B1 * | 12/2003 | Mayerle et al. | | 111/150 |
| 6,918,342 B2 | 7/2005 | Sauder et al. | | |
| 7,472,660 B2 | 1/2009 | Mariman et al. | | |
| 7,497,174 B2 | 3/2009 | Sauder et al. | | |
| 7,568,438 B2 * | 8/2009 | Arksey | | 111/121 |
| 7,584,707 B2 | 9/2009 | Sauder et al. | | |
| 7,617,782 B2 * | 11/2009 | Sheppard et al. | | 111/135 |
| 7,814,849 B1 | 10/2010 | McOmber | | |
| 7,921,787 B2 * | 4/2011 | Sauder et al. | | 111/121 |
| 7,942,102 B2 | 5/2011 | Schaffert et al. | | |
| 2007/0044694 A1 * | 3/2007 | Martin | | 111/121 |

* cited by examiner

*Primary Examiner* — Alicia Torres
(74) *Attorney, Agent, or Firm* — Dorsey & Whitney LLP (57) ABSTRACT

A seeding follower isolation device may include a forming bar connection portion, a seeding follower support portion, and an extension portion. The forming bar connection portion may be configured for secured attachment to a forming bar in a leading position relative to a seed tube of a planting unit. The seeding follower support portion may be configured to adjustably and removably support a seeding follower in an aft position relative to a seed tube. The extension portion may extend between the forming bar connection portion and the seeding follower support portion. The seeding follower isolation device does not contact a seed tube so that a seeding follower joined to the seeding follower isolation device is isolated from the seed tube.

14 Claims, 8 Drawing Sheets

SEEDING FOLLOWER ISOLATION DEVICE

CROSS-REFERENCE TO RELATED APPLICATIONS

This application claims the benefit, under 35 U.S.C. §119 (e), of U.S. provisional patent application No. 61/466,683, entitled "Seeding Follower Isolation Device" and filed on Mar. 23, 2011. The entire contents of the foregoing application are hereby incorporated by reference herein in their entireties as if fully set forth herein.

TECHNOLOGY FIELD

The technical field relates to seed planters. More particularly, the technical field relates to a device for supporting a seeding follower off of a forming bar isolated from a seed tube to minimize vibrations imparted to the seed tube from the follower.

BACKGROUND

Seed planters, particularly row crop planters, often include several seed planting units transversely arranged relative to a travel direction of the planter. The seed planting units may include a hopper for carrying seeds to be planted. The seeds may be selectively released from the hopper and passed through a seed tube to a furrow created in the ground by the seed planting unit. In some cases, the seed planting unit may be equipped with a seeding follower for controlling the position of the seeds as they are released from the seed tube. An exemplary seeding follower may be seen, for example, in U.S. Pat. No. 5,640,915 to Paul E. Schaffert. As shown in the referenced patent, the seeding follower may be attached to the seed tube.

BRIEF SUMMARY

In one embodiment, a furrow assembly for a planting unit may include a forming bar configured to be secured to a planting unit. The furrow assembly may further include an isolation device configured to support a seeding follower off of the forming bar. The forming bar may include a leading surface and a trailing surface, and the isolation device may be secured to the trailing surface. When the forming bar is secured to the planting unit, the forming bar may lead a seed tube along a furrow, the isolation device may position the seeding follower in an aft position relative to the seed tube and isolate the seeding follower from the seed tube, and the seeding follower may be configured to control bouncing seeds placed in the furrow by the seed tube.

In another embodiment, a furrow assembly for a planting unit may include a forming bar configured to be secured to a shank joined to a planting unit. The furrow assembly may further include an isolation device configured to support a seeding follower off of the forming bar. The forming bar may include an upper portion and a lower portion. The upper portion of the forming bar may be configured to be connected to the shank. The isolation device may be connect to the lower portion of the forming bar. When the forming bar is secured to the shank, the forming bar may lead a seed tube along a furrow, the isolation device may position the seeding follower in an aft position relative to the seed tube and isolate the seeding follower from the seed tube, and the seeding follower may be configured to control bouncing seeds placed in the furrow by the seed tube.

In another embodiment, a furrow assembly for a planting unit may include a forming bar configured to be secured to a planting unit. The furrow assembly may further include an isolation device configured to be solely joined to the forming bar and to support a seeding follower off of the forming bar. When the forming bar is secured to the planting unit, the forming bar may lead a seed tube along a furrow, the isolation device may position the seeding follower in an aft position relative to the seed tube and isolate the seeding follower from the seed tube, and the seeding follower may be configured to control bouncing seeds placed in the furrow by the seed tube.

In another embodiment, a furrow assembly for a planting unit may include a forming bar configured to be secured to a planting unit. The furrow assembly may further include an isolation device configured to support a seeding follower off of the forming bar. When the forming bar is secured to the planting unit, the forming bar may lead a seed tube along a furrow, the isolation device may position the seeding follower in an aft position relative to the seed tube and isolate the seeding follower from the seed tube, the seeding follower may be configured to control bouncing seeds placed in the furrow by the seed tube, and the isolation device may be configured to be in a lower position relative to a centrally located axle of a furrowing disc.

In another embodiment, a furrow assembly for a planting unit may include a forming bar configured to be secured to a planting unit. The furrow assembly may further include an isolation device configured to support a seeding follower off of the forming bar. When the forming bar is secured to the planting unit, the forming bar may lead a seed tube along a furrow, the isolation device may position the seeding follower in an aft position relative to the seed tube and isolate the seeding follower from the seed tube, the seeding follower may be configured to control bouncing seeds placed in the furrow by the seed tube, and the isolation device may not be directly connected to a shaft that secures a furrowing disc to the planting unit.

In another embodiment, a seeding follower isolation device for use with a furrow assembly may include a forming bar connection portion configured for secured attachment to a forming bar. The seeding follower isolation device may further include a seeding follower support portion. The seeding follower support portion may be configured for adjustably supporting a seeding follower such that a first portion of the seeding follower may be above the seeding follower support portion and a second portion of the seeding follower may be below the seeding follower support portion. The seeding follower isolation device may further include an extension portion extending between the forming bar connection portion and the seeding follower support portion. When the seeding follower isolation device is secured to the forming bar, the forming bar may lead a seed tube along a furrow, the seeding follower isolation device may position the seeding follower in an aft position relative to the seed tube and isolate the seeding follower from the seed tube, and the seeding follower may be configured to control bouncing seeds placed in the furrow by the seed tube.

In another embodiment, a seeding follower isolation device for use with a furrow assembly may include a forming bar connection portion configured for secured attachment to a forming bar. The seeding follower isolation device may further include a seeding follower support portion configured for adjustably supporting a seeding follower such that different portions of the seeding follower may selectively contact the seeding follower support portion. The seeding follower isolation device may further include an extension portion extending between the forming bar connection portion and the seeding follower support portion. When the seeding follower isolation device is secured to the forming bar, the forming bar may lead a seed tube along a furrow, the seeding follower isolation device may position the seeding follower in an aft position relative to the seed tube and isolate the seeding follower from the seed tube, and the seeding follower may be configured to control bouncing seeds placed in the furrow by the seed tube.

In another embodiment, a seeding follower isolation device for use with a furrow assembly may include a forming bar connection portion configured for secured attachment to a forming bar. The seeding follower isolation device may further include a seeding follower support portion configured for adjustably supporting at least one aperture of a seeding follower at different elevations relative to the seeding follower isolation device. The seeding follower isolation device may further include an extension portion extending between the forming bar connection portion and the seeding follower support portion. When the seeding follower isolation device is secured to the forming bar, the forming bar may lead a seed tube along a furrow, the seeding follower isolation device may position the seeding follower in an aft position relative to the seed tube and isolate the seeding follower from the seed tube, and the seeding follower may be configured to control bouncing seeds placed in the furrow by the seed tube In another embodiment, a seeding follower isolation device for use with a furrow assembly may include a forming bar connection portion configured for secured attachment to a forming bar. The seeding follower isolation device may further include a seeding follower support portion. The seeding follower support portion may include a plurality of apertures configured to support a seeding follower at different elevations relative to the seeding follower isolation device. The seeding follower isolation device may further include an extension portion extending between the forming bar connection portion and the seeding follower support portion. When the seeding follower isolation device is secured to the forming bar, the forming bar may lead a seed tube along a furrow, the seeding follower isolation device may position the seeding follower in an aft position relative to the seed tube and isolate the seeding follower from the seed tube, and the seeding follower may be configured to control bouncing seeds placed in the furrow by the seed tube.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

DETAILED DESCRIPTION

The present disclosure relates to a furrow assembly for supporting a follower and isolating the follower from the seed tube to avoid imparting vibrations from the follower to the seed tube. The furrow assembly may include an isolating device for supporting the follower. The isolation device, for example, may be secured to the forming bar and may extend from the forming bar along the side of the seed tube to support the follower in an aft position relative to the seed tube. The isolation device may pass by the seed tube without contacting the seed tube thereby isolating the seed tube from any vibratory effects from the supported follower. The furrow assembly may be placed in a furrow between two furrowing discs, for example, and the follower may assist with suitable seed placement by dragging along the sides and the bottom of the furrow. The vibrations resulting from the dragging action of the follower may be absorbed by the forming bar and the other portions of the seed planting unit and excessive vibrations of the seed tube may be avoided.

Figure 1:
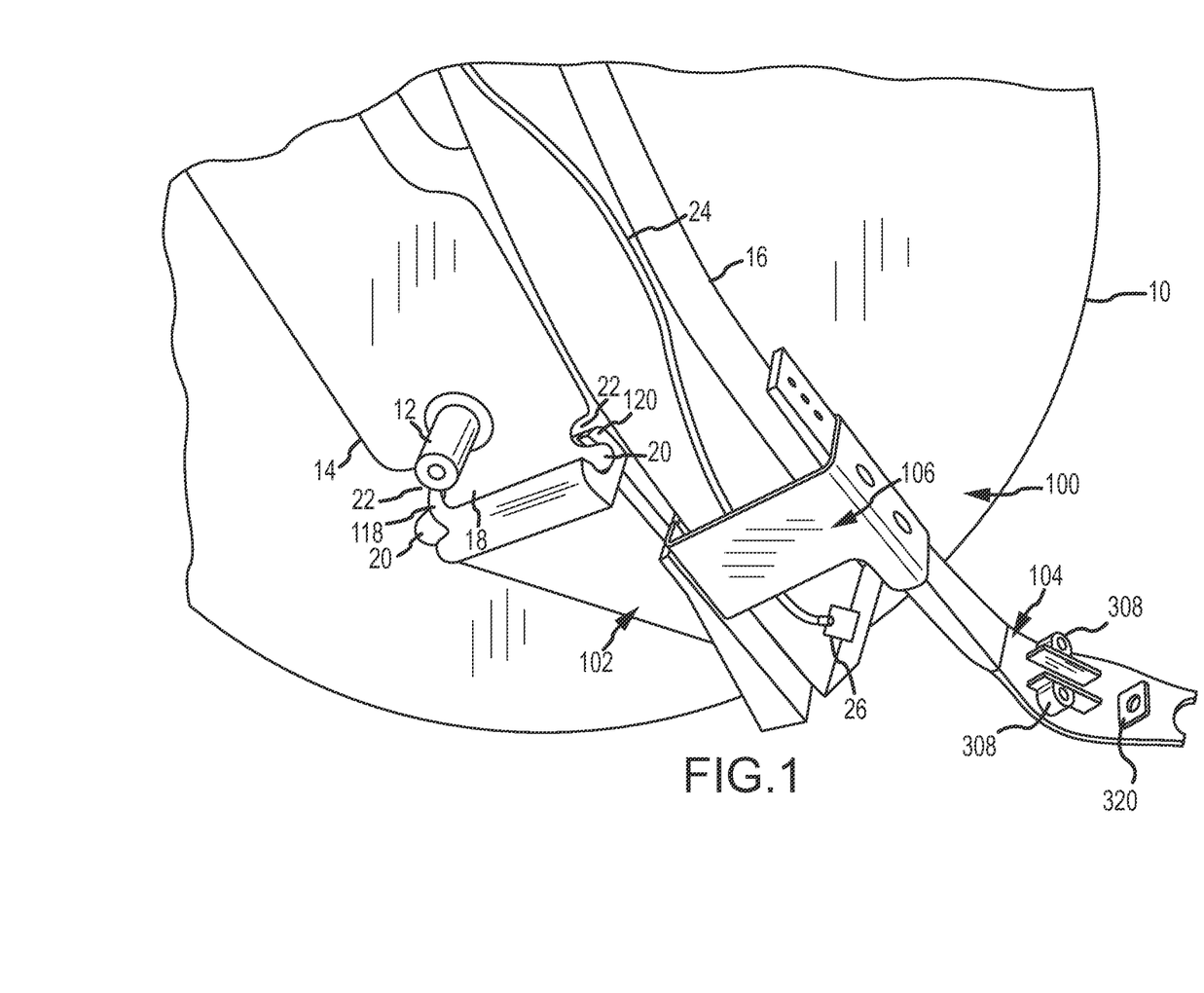
FIG. 1 is a perspective view of a portion of a seed planting unit for creating a furrow and placing a seed therein according to certain embodiments.

Referring now to FIG. 1, a portion of a seed planting unit is shown. The portion shown includes a furrowing disc 10 supported on a shaft 12, which may also be referred to as a central axle or a centrally located axle of the furrowing disc 10, passing through a downward extending shank 14 of a seed planting unit. The unit may include a pair of discs 10 for creating a furrow, and the near disc is omitted in this view to reveal the elements between the discs 10. A seed tube 16 is shown extending along the aft side of the downward extending shank 14. A furrow assembly 100 is also shown connected to the shank 14. The furrowing discs 10 may be adjusted upward or downward to a desired furrow depth relative to a ground surface. The portion shown may be moved along the ground such that the discs 10 create a furrow and the seed tube 16 extends down between the discs 10 and intermittently delivers seeds to the furrow. The timing of the seed delivery together with the speed of the planter may be coordinated to provide a proper seed spacing for the crop being planted.

Figure 2:
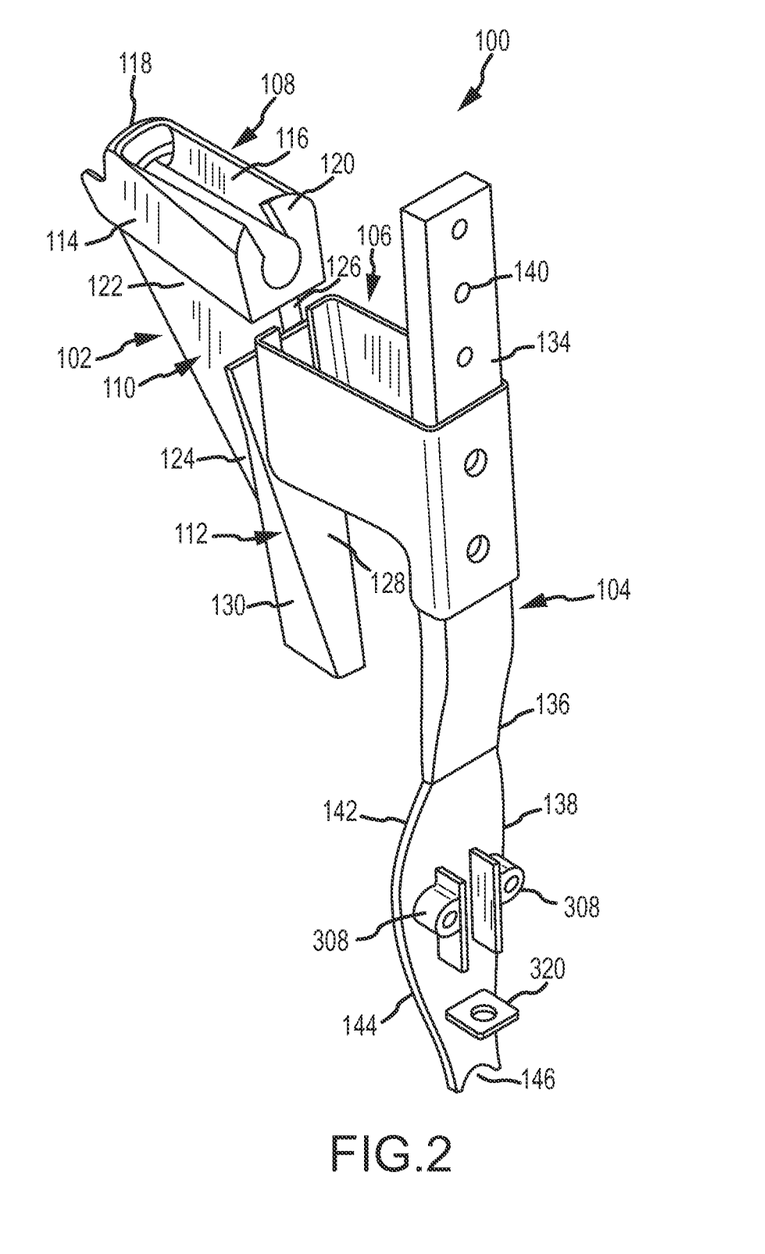
FIG. 2 is a perspective view of a furrow assembly of the portion of the seed planting unit of FIG. 1.

Referring now to FIG. 2, a perspective view of the furrow assembly 100 of FIG. 1 is shown. The furrow assembly 100 may include a forming bar 102 for preparing the furrow to receive a seed from the seed tube 16. The furrow assembly 100 may also include a follower 104 for following the seed tube 16 to bring bouncing seeds to rest in the bottom of the furrow. The assembly may also include an isolating device 106 for supporting the follower 104 off of the forming bar 102.

The forming bar 102 may be positioned between the furrowing discs 10, while leading the seed tube 16. The forming bar 102 may be configured to maintain the separation of the furrowing discs 10 thereby protecting the lateral sides of the seed tube from contact by the furrowing discs 10. The forming bar may also function as a scraper for clearing mud off of the inside surface of the furrowing discs. The forming bar may include an upper portion and a lower portion. The upper portion of the forming bar 102 may include a shank connecting portion 108, and the lower portion of the forming bar 102 may include a rib portion 110 and a blocking portion 112.

The shank connecting portion 108 may be configured to engage the shank 14 of the planting unit and resist dislodgement under forces imparted during planting operations. As shown in FIG. 1, the shank 14 of the planting unit may include an engagement feature in the form of an ear portion 18 having front and back tabs 20 defining corresponding front and back notches 22. As such, the shank connecting portion 108 of the forming bar 102 will be described as being configured for engaging this type of engagement feature on the shank 14. However, it is to be appreciated that other manufacturers of planters may provide alternative engagement features. As such, alternative shank connecting portions 108 may be provided on the forming bar 102 for suitably engaging such engagement features.

As shown, the shank connecting portion 108 may include a generally block-shaped mass 114 having a slot 116 arranged therein leading to a central cavity for receiving the ear 18 of the shank 14 on the planting portion. In some embodiments, the mass 114 may be generally rectangular in shape or the mass 114 may be cylindrically shaped. Other shapes may also be provided. The cavity may pass through the block-shaped mass 114 at each end. A bridge 118 may be provided that extends fully across the open side of the slot 116 at one end of the cavity and a catch 120 may be provided that extends partially across the open side of the slot 116 at an opposite end of the cavity.

The rib portion 110 of the forming bar 102 may be configured to extend from the block-shaped mass 108 to support the blocking portion 112. The rib portion 10 may further be configured to cut through debris or other matter in the furrow as it follows the furrowing discs 10. The rib portion 110 may extend from a first end 122 at the block-shaped mass 108 in a direction opposite the open side of the slot 116 to a second end 124. The rib 110 may be generally plate-like with a generally wider width at the first end 122 and a narrower width at the second end 124. The rib 110 may include a rear edge 126 for attachment of the blocking portion 112.

Figure 3:
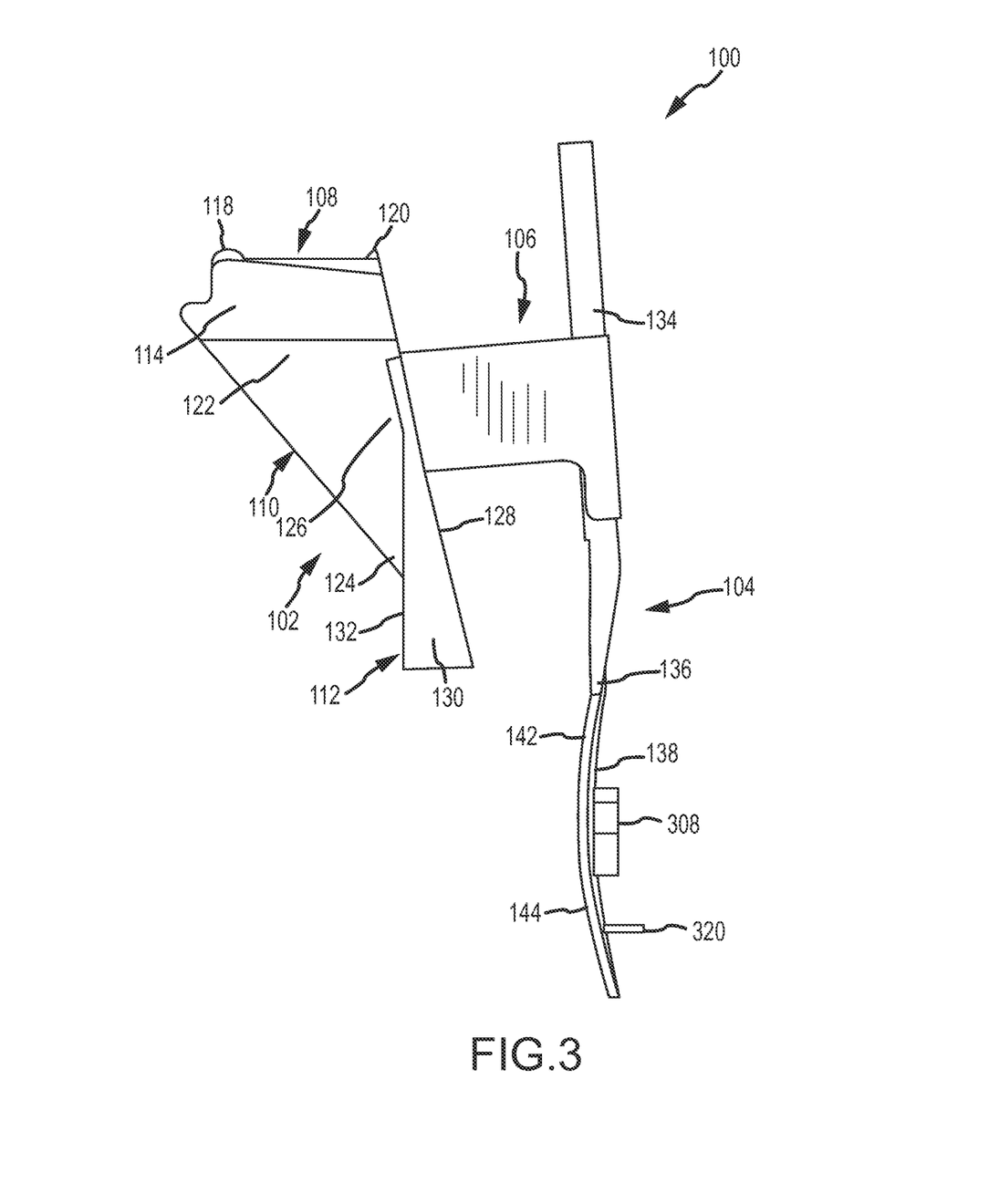
FIG. 3 is a side view of the furrow assembly of FIG. 2.

The blocking portion 112 may be connected to the rear edge 126 of the rib portion 110 and may be configured to clear the furrow of debris and create a seed bed in the bottom of the furrow. The blocking portion 112 may be relatively broad compared to the rib portion 110. As shown in FIGS. 2 and 3, the blocking portion 112 may have a rear facing surface or a trailing surface 128 having a width similar to the seed tube 16 or slightly smaller. The rear facing surface or the trailing surface 128 may taper slightly from top to bottom as shown. In addition, the rear facing surface or the trailing surface 128 may be slightly inclined as shown best in FIG. 2. The blocking portion 112 may also have two opposing side surfaces 130. As best shown in FIG. 3, the side surfaces may increase in width from top to bottom. The blocking portion 112 may further include a front facing surface or a leading surface 132. The front facing surface or the leading surface 132 may have a width somewhat smaller than the rear facing surface or the trailing surface 128 defining a slight wedge shape when viewed from above or below.

The forming bar 102 including the shank connecting portion 108, rib portion 110, and blocking portion 112 may be cast or built up and may be formed of a substantially wear resistant material. For example, the forming bar 102 may be made from steel, steel alloy, or other metals. Other materials may also be used. The forming bar may be hardened, annealed, or otherwise heat treated to further add to its wear resistance and strength. In addition, corrosion resistance may be provided by using stainless steel for example, or galvanization, or paint.

Figure 8:
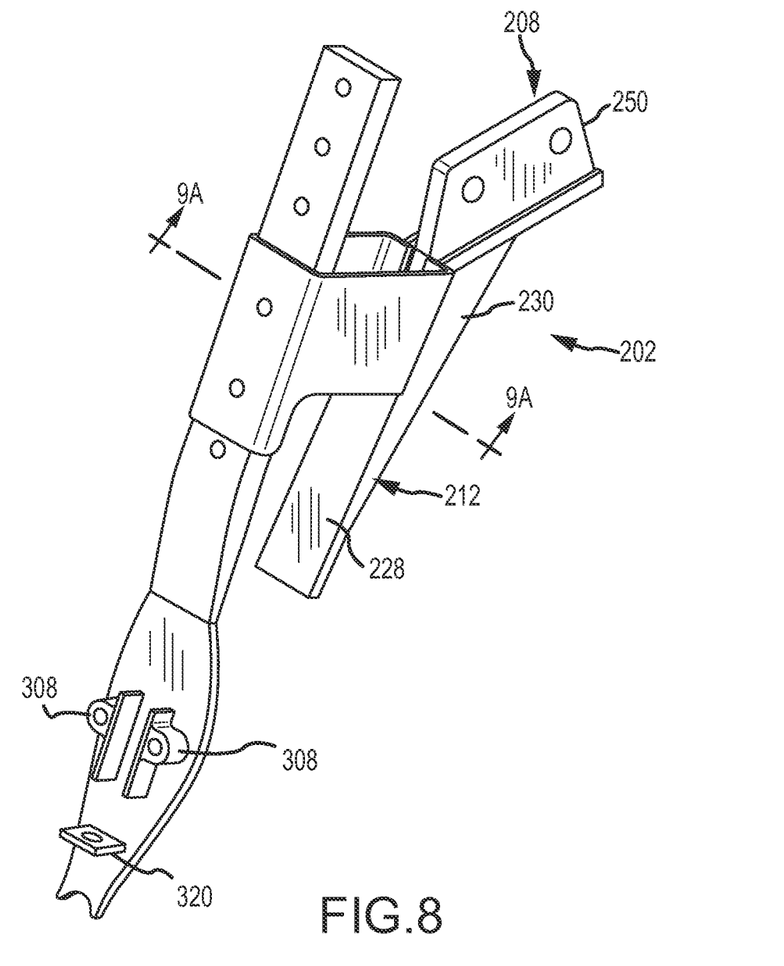
FIG. 8 is a perspective view of an isolation device positioned on a forming bar and supporting a follower according to another embodiment.

The forming bar 102 described is just one example of the many forming bars available for use with a planting unit. Other types and brands of forming bars 102 may also be used. The forming bar 102 may have different shapes and may have different arrangements for engaging the forming bar 102 with the planting unit. For example, as shown in FIG. 8, an alternative forming bar 202 with a tab-like shank connecting portion 208 and a wedge-like blocking portion 212 may be provided. In this embodiment, the tab-like shank connecting portion 208 may include apertures 250 for fastening the forming bar 202 to the shank 14 of the planting unit. Although apertures are shown as circular holes in the figures, apertures may take the form of, for example but not limited to, square openings, elongated slots, or any other suitable shapes or forms. The wedge-like blocking portion 212 may include a rectangular shaped rear facing surface or a trailing surface 228 that abuts the isolation device 106. Still other forming bars 102 may also be provided.

With reference again to FIG. 1, the follower 104 may be positioned rearward of the seed tube 16 and may be configured, as mentioned, to bring bouncing seeds to rest in the bottom of the furrow. The follower 104 may be further adapted to scrape or dislodge seeds from the sides of the furrow and cause them to fall to the bottom of the furrow into a more suitable position. The follower 104 may be a generally elongate and flexible element configured for being dragged behind the seed tube 16 and flexibly engage the furrow. With reference to FIG. 2, the follower 104 may include a connection portion 134, a neck portion 136, and a dragging portion 138.

The connection portion 134 of the follower may be configured for adjustable connection of the follower to a supporting member. The adjustable connection may allow the depth of the follower 104 relative to the furrow to be adjusted thereby providing the farmer with some control over the level of engagement of the follower 104 with the furrow. The connection portion 134 may include one or more fastener holes or apertures 140 as shown. Alternatively, the connection portion 134 may include slotted holes, a ratchet type connection, a friction type clamp, or other fastening mechanism. Other fastening devices may be provided for the connection portion 134. The one or more fastener holes or apertures 140 shown may allow for selective alignment of holes or apertures in the follower 104 with apertures in a supporting member to control the depth of the follower 104. The connection portion 134 may have a width similar to that of the seed tube 16 or slightly wider to allow a snug engagement with the isolation device 106 described below.

The neck portion 136 of the follower 104 may be positioned between the connection portion 134 and the dragging portion 138. The neck portion 136 may include a flexibility feature in the form of a reduced thickness, width, or both, providing an increased level of flexibility relative to the connection portion 134, for example. Alternative flexibility features may be provided such as score marks, grooves, or material changes. Other flexibility features may also be provided.

The dragging portion 138 may extend from the neck portion 136 and may be shaped and sized to engage the bottom and sides of the furrow. As shown, the dragging portion 138 may be somewhat teardrop-shaped so as to gradually engage the furrow along a front side edge 142 and feather out of engagement along a trailing side edge 144. The trailing side edges 144 of the dragging portion 138 may form an acute angle or V-shape allowing for inclined engagement with the V-shaped furrow. That is, the trailing side edges 144 of the dragging portion 138 may form a tighter V-shape than the furrow due to the inclined engagement of the dragging portion 138 with the furrow. The rear portion of the dragging portion 138 may include a truncating notch 146 allowing seeds in the bottom of the furrow to pass through the notch 146 without unduly being pressed into the bottom of the furrow and further avoiding dragging the seeds along the furrow. As also shown, the dragging portion 138 may further include irrigation support features for securing liquid fertilization tubes or other items to the follower 104.

The follower 104 may be made from a resilient material allowing it to repeatedly flexibly engage the furrow. The follower 104 may be made from a high density polymer, for example. Other polymer materials or other materials may also be used.

Other types, shapes, and kinds of followers 104 may also be provided. In some embodiments, the followers described in U.S. Pat. No. 5,640,915, the contents of which are hereby incorporated by reference herein in their entirety, may be provided. In some embodiments, the followers described in U.S. Pat. No. 7,942,102, the contents of which are hereby incorporated by reference herein in their entirety, may be provided. Other types of followers may also be used such as flaps positioned in the path of the seed to be placed or positioned above the placement location, chains hanging in the path of the seed to be placed or above the placement location, and firming bars for pressing the seed into the bottom of the furrow. Still other types of followers may also be used or selected to suitably assist keeping the seeds in the furrow upon being released from the seed tube.

Figure 6:
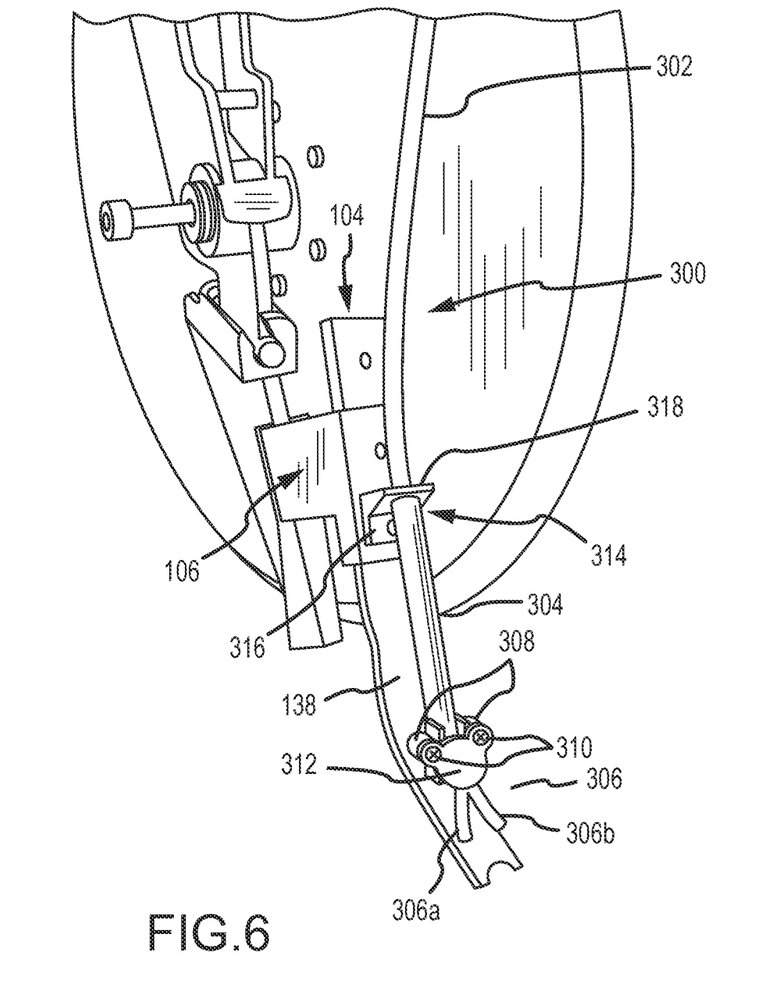
FIG. 6 is a perspective view of a portion of a seed planting unit, according to another embodiment.
Figure 7:
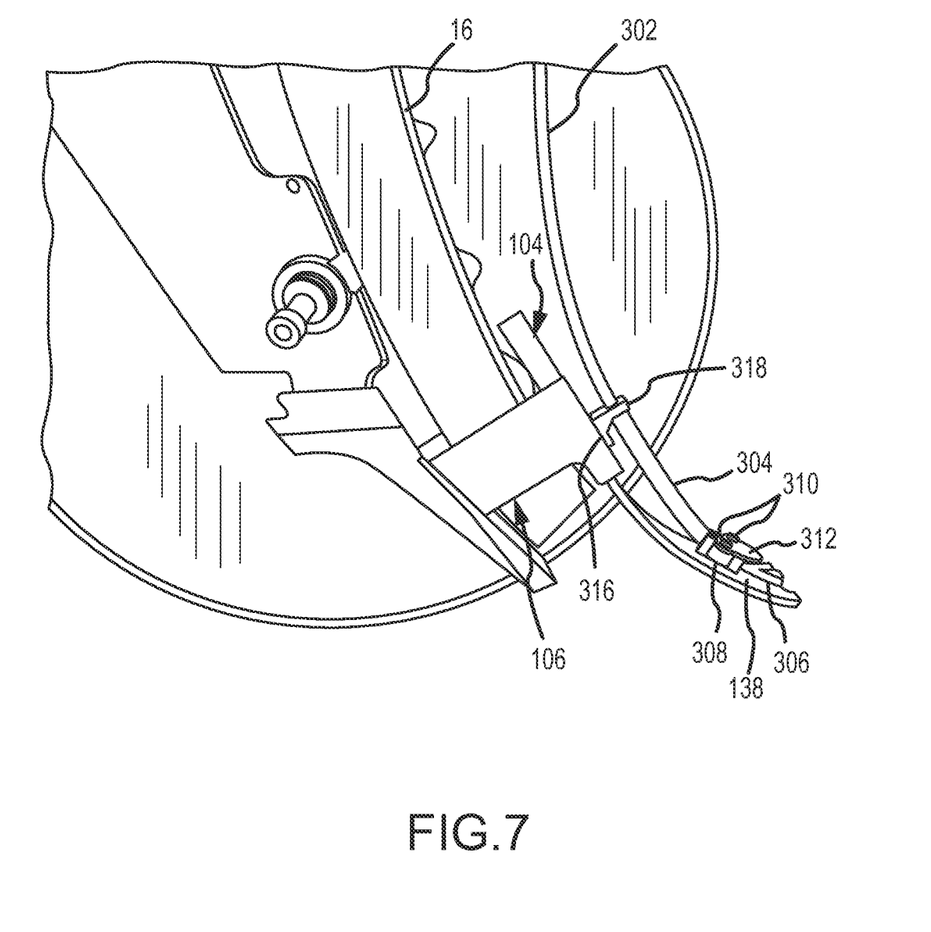
FIG. 7 is a side view of a portion of the seed planting unit of FIG. 6, further showing a seed tube positioned within the aperture of the isolation device.

With reference to FIGS. 6 and 7, an irrigation device 300 and the supporting features thereof will be described. With reference to FIG. 6, the irrigation device 300 may include a liquid supply hose 302. The liquid supply hose 302 may extend generally downwardly and may be attached to the follower 104. The liquid supply hose 302 may be inserted into a sleeve 304 and configured to be in fluid connection with a liquid distribution channel 306. The liquid distribution channel 306 may include two liquid distribution outlets 306a and 306b for distributing liquid onto sidewalls of a furrow. The liquid distribution channel 306 may include only one outlet or more than two liquid distribution outlets, or any structure that distributes liquid onto one or both sidewalls and/or bottom of a furrow. The inlet portion of the liquid distribution channel 306 may include a barbed or ribbed portion for engaging the liquid distribution channel 306 to the liquid supply hose 302, or vice versa.

Further with reference to FIG. 6, the dragging portion 138 of the follower 104 may include a pair of protrusions 308 configured for securing a portion of the irrigation device 300. The protrusions 308 may be formed on opposite sides of a centerline along the length of the upper surface of the dragging portion 138. Each protrusion 308 may be configured to receive a fastener 310, such as a screw, by way of an aperture.

A retaining plate 312 including apertures may be secured on top of the protrusions 308 by the fasteners 310 to form a tunnel for retaining the liquid distribution device 300 to the dragging portion 138 of the follower 104. In some embodiments, the protrusions 308 may be formed through injection molding along with the dragging portion 138 of the follower 104. The protrusions 308 may take the form of, for example but not limited to, an upstanding elongate rectangular arrangement. Other shapes and sizes may also be possible. For example, the protrusions 308 may define a prong or a bracket, the protrusions 308 may extend for a greater or lesser length along the upper surface of the dragging portion 138, and the protrusions 308 may be of differing height. Similarly, the retaining plate 312 may be of any suitable shape or sizes. The retaining plate 312 may be flat or non-flat.

An eyelet 314 may be included for guiding and/or securing the irrigation device along the follower 104. The eyelet 314 may include a seat portion 316 and a wall portion 318. The seat portion 316 may be configured with one or more apertures for securing to the follower 104, the isolation device 106, or both with fasteners. The wall portion 318 may be configured with an aperture for letting the irrigation device 300 pass through. More eyelets may be optionally provided for guiding and/or securing the irrigation device. In some embodiments, the eyelet 314 may be positioned on an upper portion and along a center line of the follower 104. In some embodiments, the eyelet 314 may be positioned on a lower portion and along a center line of the follower 104. When more than one eyelet 314 is provided, the eyelets 314 may be arranged in any suitable positions relative to the protrusions 308.

The eyelet 314 and the protrusions 308 may be positioned such that the sleeve 304 may be positioned therebetween. The sleeve 304 may be configured to be in other positions. For example, the eyelet 314 may be suitably sized for letting the sleeve 304 pass therethrough and securing the sleeve 304 thereto. The eyelets 314 may be formed separately from the follower 104 and secured thereto by way of apertures and fasteners. The eyelets 314 may be formed along with the follower 104 by way of, for example, but not limited to, injection molding along with the dragging portion 138 thereby omitting the seating portion 316. With reference to FIG. 1, an eyelet 320 may be configured near an end portion of the dragging portion 138 of the follower 104. The eyelet 320 may include an aperture suitably sized for holding the liquid supply hose 302 and/or the liquid distribution channel 306 to help prevent a disconnection therebetween.

Other types, shapes, kinds and configurations of an irrigation device 300 and the supporting structure there of may also be provided. In some embodiments, the irrigation devices described in U.S. Pat. No. 7,942,102, the contents of which are hereby incorporated by reference herein in their entirety, may be provided.

The isolating device 106 may be configured to support the follower 104 isolated from the seed tube 16 to avoid vibrations from the follower 104 being imparted on the seed tube 16. As shown in FIG. 1, the isolation device 106, in some embodiments, may not be directly connected to the shaft 12 that secures the furrowing disc to the planting unit. The isolating device 106 may be secured to the forming bar 102, extend past the seed tube 16, and support the follower 104 in a rearward or aft position relative to the seed tube 16. In some embodiments, the isolation device 106 may be located lower than the shaft, or the centrally located axle 12 of the furrowing disc. Further, in some embodiments, the isolation device 106 may be solely joined to, or solely supported by, the forming bar 102. In some embodiments, the isolation device 106 may be joined or secured to the rear facing surface or the trailing surface 128 of the forming bar 102.

Figure 4:
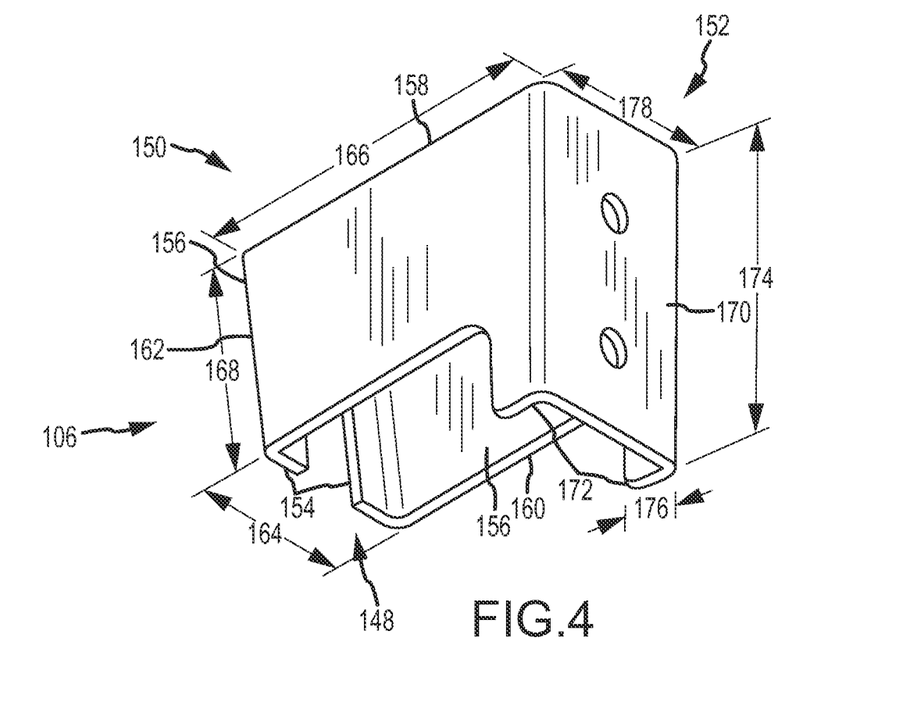
FIG. 4 is a perspective view of an isolation device of the furrow assembly of FIG. 2.

With reference to FIG. 4, the isolating device 106 may be in the form of a bracket including a forming bar connection portion 148, an extension portion 150, and a follower support portion 152. While the isolating device 106 is shown as a bracket, the device 106 may take other forms such as a plate, an angle, an arm, a bar, or other supporting type element. For purposes of discussion, the isolating device 106 will be referred to as a bracket.

The forming bar connection portion 148 may include a pair of flanges 154. The pair of flanges 154 may be turned inward for placement against the rear facing surface or the trailing surface 128 of the blocking portion 112 of the forming bar 102. The flanges 154 may be generally flat, planar elements for abutting the blocking portion 112 of the forming bar 102. Where a non-flat rear facing surface or a non-flat trailing surface 128 of the forming bar 102 is provided, alternatively shaped flanges 154 may be provided. In some embodiments, the flanges 154 may, for example, include inwardly or outwardly extending tabs and one or more tabs may be provided. The flanges 154 may further be configured and oriented for securing to alternative surfaces of the forming bar 102, such as the sides or leading surface of the forming bar 102. Other shaped flanges 154 and numbers of flanges 154 may be provided.

The flanges 154 may be configured for welded attachment to the blocking portion 112 or the flanges 154 may include apertures for fastening to the blocking portion 112. The apertures may take the form of, for example but not limited to, circular holes, square openings, elongated slots, or any other suitable shapes or forms. Bolt or screw holes may be provided in alignment with corresponding bolt or screw holes on the blocking portion 112 of the forming bar 102. Other fastening systems for securing the flanges 154 to the blocking portion 112 may also be provided.

Figure 9A:
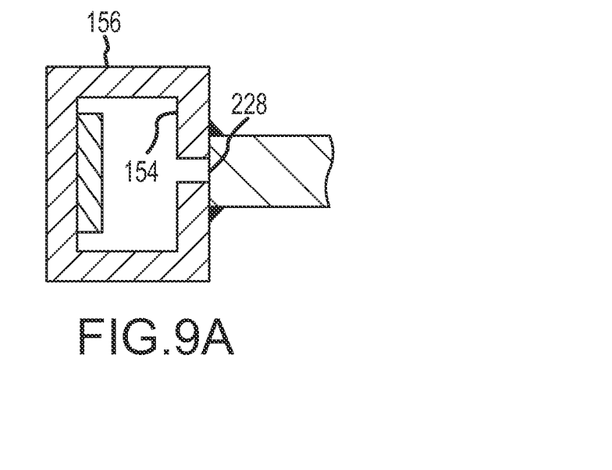
FIG. 9A is an enlarged partial schematic cross section view of the isolation device positioned on the forming bar of FIG. 8, viewed along line 9A-9A of FIG. 8.
Figure 9B:
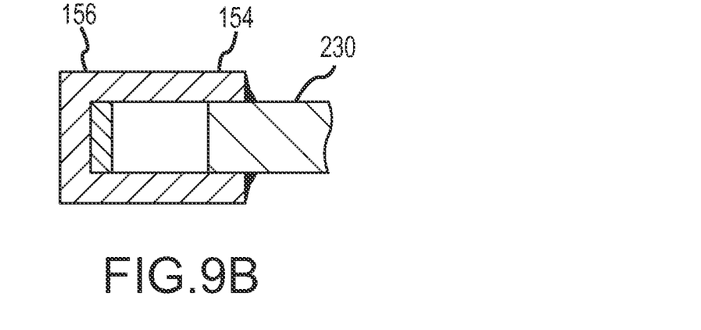
FIG. 9B is an enlarged partial schematic cross section view similar to the view shown in FIG. 9A, but differing from FIG. 9A in that it shows another potential way to connect the isolation device to the forming bar.
Figure 9C:
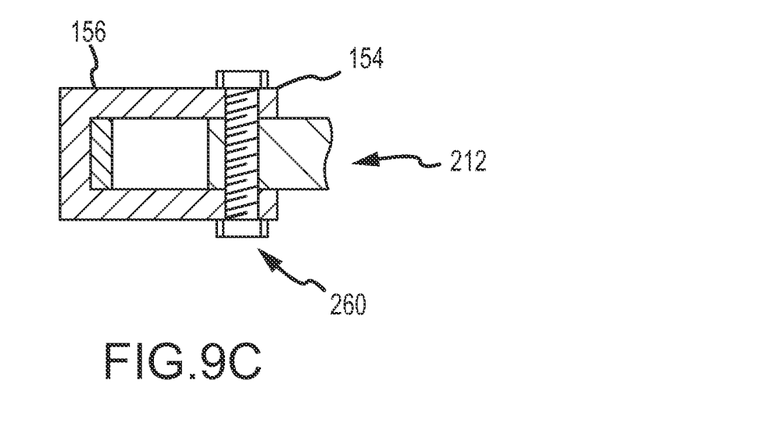
FIG. 9C is an enlarged partial schematic cross section view similar to the view shown in FIGS. 9A and 9B, but differing from FIGS. 9A and 9B in that it shows another potential way to connect the isolation device to the forming bar.

With reference to FIGS. 9A-C, various embodiments are shown for attaching the isolation device 106 to a forming bar 202. With reference to FIG. 9A, the flanges 154 may be configured for welding to the rear facing surface or the trailing surface 228 of the blocking portion 212. With reference to FIG. 9B, the flanges 154 may extend from the sidewalls 156 and be configured for welding to the side surfaces 230 of the blocking portion 212. With reference to FIG. 9C, the flanges 154 and the blocking portion 212 may include apertures. By selectively aligning the apertures of the flanges 154 and the blocking portion 212, the isolation device 106 may be secured to the forming bar 202 through a nut and bolt arrangement 260. Any other suitable fastening systems for securing the flanges 154 to the blocking portion 212 may also be provided.

Referring back to FIG. 4, the extension portion 150 of the isolation device 106 may include a pair of spaced apart side walls 156. The sidewalls 156 may be generally plate-like elements for placement along side the seed tube 16 to extend from the flanges 154, past the seed tube 16, and to the follower support portion 152. The sidewalls 156 may extend from the flange 154 at approximately 90° or another angular relationship may be provided. For example, where the flanges 154 connect to the side of the forming bar 102, the sidewalls 156 may extend from the flange 154 at approximately 180°. The sidewalls 156 may be solid, as shown, or they may be perforated, for example. The sidewalls 156 may include a top edge 158, a bottom edge 160, and a leading edge 162. The leading edge 162 may be generally orthogonal to the top and bottom edges 158, 160, but may be tipped slightly by approximately 7°, for example. Other angles may be provided for accommodating the relative incline between the forming bar 102 and the follower 106. For example, the angle that the leading edge 162 is tipped from orthogonal may range from approximately 1° to approximately 15°. In other embodiments the angle may range from approximately 3° to approximately 12°. In still other embodiments, the angle may range from approximately 5° to approximately 10°.

The sidewalls 156 may be spaced apart a distance slightly larger than the corresponding depth of the seed tube 16 to minimize or avoid contact between the isolation device 106 and the seed tube 16. In one embodiment, the sidewalls 156 may be spaced apart by a distance 164 ranging from approximately ¼" to approximately 3". In other embodiments, the sidewalls may be spaced apart by a distance 164 ranging from approximately ½" to approximately 2". In still other embodiments, the sidewalls may be spaced apart by a distance 164 of approximately 1".

The sidewalls 156 may have a length 166 measured between the flange 154 and the follower support portion 152 that is also slightly larger than a corresponding width of the seed tube 16. The sidewalls 156 may have a length 166 ranging from approximately ¼" to approximately 6". In other embodiments, the sidewalls 156 may range from approximately 1" to approximately 3". In still other embodiments, the sidewalls 156 may be approximately 2" long.

The sidewalls 156 may have a height 168, measured parallel to the seed tube 16, sufficient to suitably support the follower 104 and resist upward and downward forces on the follower 104. The sidewalls 156 may have a height 168 ranging from approximately ¼" to approximately 6". In other embodiments, the height 168 may range from approximately ½" to approximately 3". In still other embodiments, the height 168 may be approximately 1½".

The follower support portion 152 may be configured for attachment to the follower 104 and for secured, adjustable, and replaceable support thereof. The follower support portion 152 may be configured to support and brace the follower 104 to maintain the position and orientation of the follower 104 under the dragging forces imparted on the follower 104 during planting. As such, the follower support portion 152 of the isolation device 106 may include a channel-shaped element for receiving the follower 104 in a seating relationship on an inside of the isolation device 106. The channel-shaped element may include a connecting wall 170 and two lateral flanges 172. The lateral flanges 172 may be formed from continued portions of the sidewalls 156. The lateral flanges 172 may extend substantially perpendicular to the top and bottom edges 158, 160 of the sidewalls 156 and may have a length 174 slightly longer than the height 168 of the sidewalls 156. The flanges 172 may also have a width 176 substantially equal to the thickness of the connecting portion 134 of the follower 104. Other widths 176 and lengths 174 may be provided. For example, a width 176 larger or smaller than the thickness of the follower 104 may be provided and a length 174 substantially equal to the height 168 of the sidewalls 156 may be provided. The flanges 172 may be arranged in plane with the sidewalls 156 of the extension portion 150 of the isolation device 106. The connecting wall 170 of the channel-shaped element may have a width 178 substantially equal to the distance 164 between the sidewalls 156 and may extend between the lateral flanges 172 to form a web of the channel-shaped element. Where the connection portion 134 of the follower 106 described above is wider than the seed tube 16, the connection portion 134 may snugly engage the inside surface of the lateral flanges 172 adding to the security of the connection. The connecting wall 170 may include connection features in the form of one or more apertures for receiving fasteners to connect the follower 104 to the isolation device

106. With reference to FIG. 2, the one or more apertures of the connecting wall 170 may be selectively aligned with one or more of the fastener apertures 140 of the follower 104. Selective alignment of the one or more apertures of the connecting wall 170 of the isolation device 106 with one or more of the fastener apertures 140 of the follower 104 may allow the follower 104 to be adjustably and removably supported at different elevations relative to the isolation device 106. Accordingly, one or more of the fastener apertures 140 of the follower 104 may be adjustably and selectively positioned relative to the follower support portion 152 at different elevations. The apertures of the connecting wall 170 may take the form of, for example but not limited to, circular holes, square openings, elongated slots, or any other suitable shapes or forms. Other fastening devices or features may be provided for connecting the follower 104 to the isolation device 106.

Figure 5:
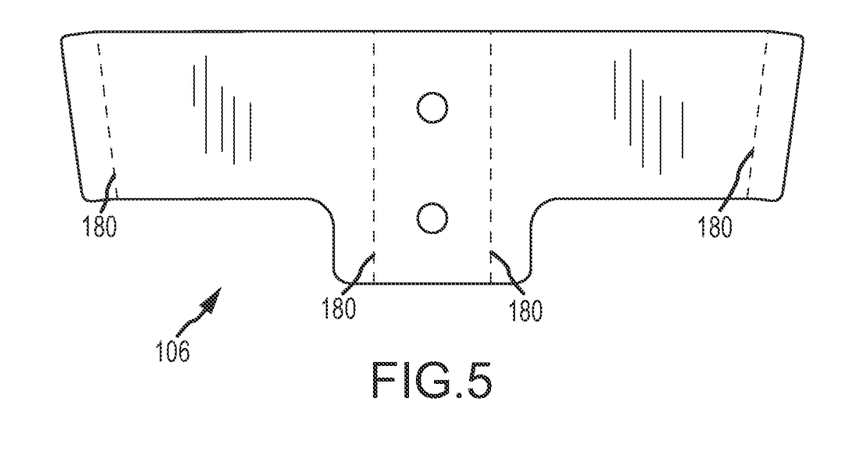
FIG. 5 is a pre-formed view of the isolation device of FIG. 4.

As shown in FIG. 5, the isolation device 106 including the forming bar connection portion 148, the extension portion 150, and the follower support portion 152 may be formable by bending a piece of flat material. The flat material shown may be bent along the bend lines 180 and the bend may include a radius ranging from $1/64"$ to $1/4"$. In other embodiments, the radius may be approximately $1/16"$. The isolation device 106 may be formed from a metal plate such as steel, steel alloy, or other metals. As with the forming bar 102, hardening, annealing, or other heat treatments may be provided. The isolation device 106 may also be corrosion resistant by being made from stainless steel, for example, or being galvanized, painted, or otherwise protected. The plate may have a thickness ranging from approximately 28 gauge to approximately 3 gauge. In other embodiments, the plate may have a thickness ranging from approximately 24 gauge to approximately 11 gauge. In still other embodiments, the plate may have a thickness ranging from approximately 24 gauge to approximately 16 gauge. Other thickness ranges may also be provided. The isolation device 106 may also be made by other means including casting, cutting and the like.

The isolation device 106 may allow for support of the follower 104 in isolation from the seed tube 16. The isolation device 106 may pass by the seed tube 16 without contacting the seed tube 16 thereby isolating the seed tube 16 from any vibratory effects from the supported follower 104. The furrow assembly 100 may be placed in a furrow between two furrowing discs 10, for example, and the follower 104 may assist with suitable seed placement by dragging along the sides and the bottom of the furrow. The vibrations resulting from the dragging action of the follower 104 may be absorbed by the forming bar 102 and the other portions of the seed planting unit and excessive vibration of the seed tube 16 may be avoided.

In some embodiments, as shown in FIG. 1, the isolation device 106 may provide sufficient clearance around the seed tube 16 for passing a lead 24 through the isolation device 106 with the seed tube 16. The lead 24, for example, may be connected to a sensor 26 configured for sensing seeds or placement thereof, fertilizer or placement thereof, other liquids or placement thereof, and the like. The sensor may be an optical device, an infrared device, or other sensing type device. The lead 24 may be an electrical lead, a control lead, or other mechanism for controlling, powering, communicating or otherwise connecting to the sensor or other device.

The furrow assembly 100 described, including the forming bar 102, isolation device 106, and follower 104, may be positioned on a shank 14 of a planting unit. The isolation device 106 may be pre-installed on the forming bar 102 and the forming bar 102 may be removably connected to the shank 14. That is, the shank connecting portion 108 of the forming bar 102 may be connected to the shank 14 of the planting unit by positioning below and slightly forward of the ear 18 on the shank 14 of the planting unit. The forming bar 102 may be tipped slightly to the side and may be moved upward to receive the ear 18 of the shank in the slot 116 of the block-shaped mass 114. The forward position of the forming bar 102 may allow the front tab 20 on the ear 18 to clear the bridge 118 of the block-shaped mass 114 and tipping the forming bar 102 may allow the back tab 20 on the ear 18 to clear the catch 120 of the block-shaped mass 114. The forming bar 102 may then be moved rearward allowing the front tab 20 of the ear 18 to pass below the bridge 118 allowing the bridge 118 to engage the front notch 22 on the shank 14. The forming bar 102 may further be rotated from a tipped orientation to an upright orientation causing the catch 120 to engage the back notch 22 on the shank 14 thereby suspending the forming bar 102 from the front and back tabs 20 of the ear 18. The attachment of the forming bar 102 to the shank 14 may suitably place the isolation device 106 to receive the seed tube 16. The seed tube 16 may then be lowered down through isolation device 106 and into proper position for delivering seeds to the furrow. The follower 104 may be secured to the isolation device 106 by inserting the connection portion 134 of the follower 104 within the channel-shaped element of the follower support portion 152 of the isolation device 106 as shown. The follower 104 may be fastened to the isolation device 106 and may be adjusted upward or downward to a suitable position. With reference to FIGS. 1 and 2, a first portion, such as a portion of the connecting portion 134, of the follower 104 may be suitably adjusted to be above the follower support portion 152 of the isolation device 106 while a second portion, such as the neck portion 136 and the dragging portion 138, of the follower 104 may be below the follower support portion 152 of the isolation device 106. In addition to the neck portion 136 and the dragging portion 138, a portion of the connecting portion 134 of the follower 104 may also be suitably adjusted to be below the follower support portion 152 of the isolation device 106. In various embodiments, different portions of the follower 104 may be suitably adjusted to selectively contact the follower support portion 152 of the isolation device 106. Selective contact between different portions of the follower 104 and the follower support portion 152 may allow the follower 104 to be positioned at different elevations relative to the isolation device 106. The fastening system may allow the follower 104 to be replaced when the follower 104 wears out or is otherwise in need of replacement. The furrow assembly 100 may thus be made ready for use in planting operations.

As mentioned above, the isolation device 106 may take other forms other than the described bracket. For example, an isolation device similar to the one described, but with a single side wall may be provided. In other embodiments, the isolation device 106 described may be provided and the follower 104 may be secured to the outside or the inside of the isolation device. In still other embodiments, the follower 104 may be adapted for connection to the isolation device in a plane parallel to the furrow, for example. In this embodiment, the isolation device may include an angle shape where one leg is fastened to the blocking portion 112 of the forming bar 102 and the other leg extends past the seed tube 16 and is connected to the follower 104. In still other embodiments, rather than the leading edge 162 of the sidewalls 156 of the isolation device 106 being tipped, the trailing edge, and as such, the lateral flanges 172 of the follower support portion 152 may be tipped instead. Alternatively, both the leading edge 162 and trailing edge may be tipped to accommodate the difference between the incline of the forming bar 102 relative to the follower 104. Still other devices and arrangements thereof may be provided and still be within the scope of the present disclosure.

In some embodiments, the forming bar connection portion 148 of the isolation device 106 may be configured to engage the blocking portion 112 of the forming bar 102 by clipping thereto. That is, in one embodiment, each flange 154 of the pair of flanges 154 may include spaced apart flanges forming inward facing grasping jaws, for example. The jaws may be configured for sliding over the top of the blocking portion 112 of the forming bar 102. In still other embodiments, the isolation device may be formed integral with the forming bar 102. That is, the isolation device may be cast or otherwise formed together with the forming bar 102. In this embodiment, the flanges may be omitted and the extension portion of the isolation device may extend from the rearward facing surface or the trailing surface of the blocking portion 112 of the forming bar 102. In still other embodiments, the flanges may be a single wall element with no separation therebetween. In still other embodiments, the flanges may be directed outward rather than inward. In still further embodiments, the sidewalls of the isolation device may extend along the sides of the blocking portion of the forming bar 102 and may be secured thereto. In this embodiment, the flanges may be omitted.

All directional references (e.g., upper, lower, upward, downward, left, right, leftward, rightward, top, bottom, front facing, rear facing, leading, trailing, above, below, inner, outer, vertical, horizontal, clockwise, counterclockwise, and the like) are only used for identification purposes to aid the reader's understanding of the examples of the disclosure, and do not create limitations, particularly as to the position, orientation, or use of the disclosure unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and/or in fixed relation to each other.

In some instances, components are described with reference to "ends" having a particular characteristic and/or being connected with another part. However, those skilled in the art will recognize that the present disclosure is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present disclosure. It is intended that all matter contained in the above description or shown in the accompanying drawings shall be interpreted as illustrative only and not limiting. Changes in detail or structure may be made without departing from the spirit of the disclosure as defined in the appended claims.

Although the present disclosure has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the disclosure. Accordingly, the proper scope of the disclosure is defined by the appended claims. The various embodiments, operations, components and configurations disclosed herein are generally exemplary rather than limiting in scope.

What is claimed is:

1. A furrow assembly for a planting unit including a seed tube comprising:
   a forming bar configured to be secured to a planting unit;
   a seeding follower having a follower neck portion, a follower connection portion and a follower dragging portion, with the follower neck portion extending between the follower connection portion and the follower dragging portion and the follower dragging portion having a teardrop-shape that is positioned to gradually engage a furrow along a front side;
   an isolation device having a forming bar connecting portion, an extension portion, and a follower support portion, which are configured to support the seeding follower off of the forming bar, the forming bar including a leading surface and a trailing surface, and the isolation device secured to the trailing surface; and
   when the forming bar is secured to the planting unit, the forming bar leads a seed tube along a furrow, the isolation device positions the seeding follower in an aft position relative to the seed tube and isolates the seeding follower from the seed tube, and the seeding follower is configured to control bouncing seeds placed in the furrow by the seed tube.

2. The furrow assembly of claim 1, wherein the forming bar connecting portion includes a pair of inwardly turned flanges that mate against a trailing surface of the forming bar.

3. The furrow assembly of claim 2, wherein the connection between the flange and the forming bar includes a welded connection.

4. The furrow assembly of claim 2, wherein the connection between the flange and the forming bar includes a bolted connection.

5. The furrow assembly of claim 3, wherein the extension portion includes a pair of sidewalls in spaced apart relationship on opposing sides of the seed tube, wherein sidewalls include a top edge, a bottom edge, and a leading edge, with the leading edge positioned relative to the top edge at an angle in a range from approximately 5° to approximately 10°.

6. The furrow assembly of claim 5, wherein the sidewalls are spaced apart by a distance larger than a depth of the seed tube, thereby isolating the seed tube from vibrations imparted on the seeding follower, wherein the sidewalls extend from the pair of flanges at approximately 90°.

7. The furrow assembly of claim 6, wherein the follower support portion includes a channel-shaped element for seating of the follower therein.

8. The furrow assembly of claim 7, wherein the seeding follower includes a connection portion having a width, and the channel-shaped element includes a pair of lateral flanges spaced apart a distance substantially equal to the width of the connection portion of the seeding follower providing for a snug fit therein.

9. The furrow assembly of claim 8, wherein the channel-shaped element further includes a connecting wall extending between the pair of lateral flanges, wherein the seeding follower connection portion is positioned on an inside surface of the channel shaped element and on the connecting wall.

10. The furrow assembly of claim 9, wherein the connecting wall includes apertures for fastening of the seeding follower thereto and the follower connection portion includes one or more connecting elements allowing for selective alignment of connecting elements with apertures in the connecting wall allowing for selective alignment of the one or more apertures of the connecting wall with the one or more of the connecting elements causing the seeding follower to be adjustably and removably supported at different elevations relative to the isolation device.

11. The furrow assembly of claim 1, wherein the planting unit includes a lead extending adjacent to the seed tube, the forming bar connecting portion, the extension portion, and the follower support portion are arranged to form an aperture, and the aperture configured for isolated passage therethrough of the seed tube and the lead.

12. The furrow assembly of claim 10, wherein the seeding follower includes an eyelet and one or more protrusions positioned on the same side of the seeding follower that is mated with follower connection portion the such that a fertilizer delivery sleeve positioned there between is supported on the seeding follower opposite of the front side and away from the furrow.

13. The furrow assembly of claim 12, wherein the bracket includes an extension portion including a pair of sidewalls and a follower support portion including a channel-shaped element having a pair of lateral flanges and a connecting wall, wherein the sidewalls, the pair of lateral flanges, and the connecting wall define an inside of the bracket and the follower is positioned inside the bracket.

14. A furrow assembly for a planting unit including a seed tube and a shank comprising:
   a forming bar secured to a shank joined to a planting unit, the forming bar having a leading and trailing portion;
   a seeding follower having a follower neck portion, a follower connection portion and a follower dragging portion, with the follower neck portion extending between the follower connection portion and the follower dragging portion, wherein the follower dragging portion is positioned to gradually engage a furrow along a front side; and
   an isolation device configured to support a seeding follower off of the forming bar;
   wherein:
      the forming bar comprises an upper portion and a lower portion;
      the upper portion of the forming bar is configured to be connected to the shank;
      the isolation device is connected to the lower portion of the trailing portion of the forming bar by a pair of inwardly turned flanges that mate against a trailing surface of the forming bar; and
      the forming bar leads a seed tube along a furrow, the isolation device positions the seeding follower in an aft position relative to the seed tube and isolates the seeding follower from the seed tube, and the follower connection portion of the seeding follower is adjustably mounted within the isolation device and is configured to control bouncing seeds placed in the furrow by the seed tube.

* * * * *